Sept. 18, 1956  J. L. SWITZER  2,763,785
LATENT FLUORESCENT INKS
Original Filed Feb. 25, 1943

INVENTOR
Joseph L. Switzer
BY
Ely, Frye & Hamilton
ATTORNEYS

United States Patent Office 2,763,785
Patented Sept. 18, 1956

2,763,785

LATENT FLUORESCENT INKS

Joseph L. Switzer, Gates Mills, Ohio, assignor to Switzer Brothers, Inc., Cleveland, Ohio, a corporation of Ohio Original application February 25, 1943, Serial No. 477,069. Divided and this application October 2, 1952, Serial No. 312,690

8 Claims. (Cl. 250—71)

This invention relates to printing and drafting inks employed in printing or ornamenting surfaces; the invention particularly applies to inks for printing fluorescent reproductions and in providing fluorescent surface ornamentation. This application is a division of my co-pending application Serial No. 477,069 for "Fluorescent Printing" filed February 25, 1943, now United States Patent No. 2,629,956.

Although striking fluorescent reproductions may be printed, as, for example, by the methods taught in the U. S. Patents No. 2,277,169 and No. 2,302,645 to Joseph L. Switzer and Robert C. Switzer, where fluorescent printing is to be viewed under visible light as well as under filtered ultraviolet light, the printing often has a rather pastel appearance. In other words, colored fluorescent inks tend to be "weak" or pale, particularly when such fluorescent inks are contrasted with the strong non-fluorescent inks which have been developed in recent years.

When the chroma of any surface coating composition was weak, the prior art taught two general methods of overcoming the weakness, first, by mechanically increasing the thickness of the coating, or second, by increasing the concentration of the chromatic agent in the composition. For example, a painter follows the first alternative by applying several coats of paint when one coat will not "cover" the surface; a printing ink manufacturer will follow the second alternative by increasing the concentration of pigment or dye in his ink when the ink is pale. The printing industry has been limited, for all practical purposes, to the second alternative, since there are definite limits to the thickness of ink which can be deposited on a receiving surface from a mechanical printing plate or surface; any attempt to exceed this limit will result in smearing the reproduction and in loading up the plates with ink. There is also a practical limit to which a given pigment or dye may be concentrated in a printing ink. As the concentration of a pigment in a printing ink is increased, the ink loses printability and as the concentration of a dye in a printing ink is increased, the ink tends to become "muddy" and to lose its purity and cleanness of color. The art has succeeded in extending the limitation with respect to dyes by developing new color lakes and dyes which will permit a greater concentration of the chromatic agent without excessive loss of cleanness.

Unfortunately, none of the means available to the prior art for overcoming low color intensity in non-fluorescent printing could be employed in printing fluorescent inks, with the possible exception, of course, of discovering new fluorescent agents. Fluorescent pigments, with a few exceptions, are of notoriously low intensity, both as to chrome and fluorescence. Consequently, to obtain optimum brightness, pigmented fluorescent inks would require coating thicknesses which are impossible to print or pigment concentrations which destroy the printability of the inks. Fluorescent dyes are generally characterized by the fact that optimum fluorescence is obtained at a very low concentration of the dye in the carrier, which concentration of the dye for optimum fluorescence is appreciably lower than the concentration at which maximum color intensity is obtained. In fact, at concentrations for maximum color intensity, fluorescent dyes lose most, if not all, of their fluorescence. The maintenance of a low dye concentration is of particular importance in dyes which exhibit the phenomenon of "daylight fluorescence," as disclosed in greater detail in the co-pending application of Joseph L. Switzer, Robert C. Switzer and Richard A. Ward for Light-Responsive Fluorescent Media, Serial No. 455,610, now Patent No. 2,653,109, filed August 21, 1942. Increasing color concentration by laking fluorescent dyes has been unsuccessful because all known color lakes of fluorescent dyes are wholly non-fluorescent.

I have overcome the low-color intensity of printed fluorescent inks, and particularly daylight fluorescent inks, by providing inks comprising latent fluorescent components as is more fully disclosed in the following specification and by employing the method of printing disclosed in my aforesaid co-pending application, Serial No. 477,069 for "Fluorescent Printing" filed February 25, 1943. It is the object of this invention, therefore, to provide inks which may be printed with customary printing plates to yield a print which can be readily developed into a final print having both high chroma and strong fluorescence.

Further, it is an object of this invention to provide inks which may be printed to obtain a print of high-color intensity without creating muddiness in the color of the printed matter. Another object is to provide inks which can be utilized to create delicate and very gradual tints and shades in tonal and multi-color printing.

While the foregoing statement of the objects of my invention has been directed specifically to the art of printing, it will be shown that my invention is useful in other applications in the broad art of surface ornamentation. Nor is my invention necessarily restricted in its utility to the ornamentation of surfaces intended primarily for visual observation. For example, in preparing sketches and the like, and particularly in preparing fine line drawings, artists and draftsmen would usually prefer to work in a thin medium, such as ink, the term "thin" being used in this instance to describe both the viscosity of the medium and the thickness when applied. The use of such thin mediums is limited in many respects, however, by a problem similar to that encountered in printing inks, namely, the problem of obtaining high intensity of color and/or fluorescence. The problem of obtaining a high intensity of fluorescence has been of particular importance in the creation of originals to be reproduced by multi-color printing processes. The manner in which I employ my invention to overcome problems outside the art of printing is disclosed in the following specification. Other and further objects of this invention, therefore, will be apparent from the following specification, claims, and drawings in which:

Figure 1:
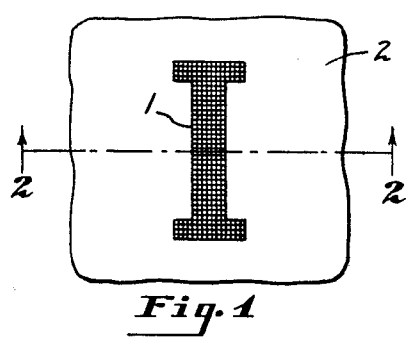
Fig. 1 is an enlarged view of a portion of a sheet illustrating an intermediate stage in printing with the inks disclosed by my invention.

In general, my method of printing with a fluorescent dye, which, for effective brightness, requires a mechanical depth in solution greater than the thickness of ink which can be deposited by a printing plate, comprises the following steps: First, the dye crystals are ground into a printable carrier in a manner similar to the manner in which insoluble pigments are ground into a printing ink. If the dye crystals are insoluble in the carrier, the resultant ink will be similar to a pigmented printing ink; if the dye crystals are soluble in the carrier, the high concentration of dye in the carrier will approach, if not equal or exceed, a saturated solution of the dye in the carrier. The dye ink (hereinafter referred to as "latent ink") is then printed on a base sheet from any suitable plates in block, dot and/or line structures delineating the characters or reproductions desired in the finished product.

Due to the extreme concentration of dye in the printed latent ink, the printed matter seldom bears any resemblance in color to the color of the characters or reproductions desired. For example, reproductions which are fiery red may be developed from dull blackish purple latent inks.

After the latent ink has been printed, the base sheet is then coated with a clear coating usually comprising a resin and a volatile solvent. The resin is a solvent for the dye and may be suitably plasticized, if necessary; the solvent is a mutual solvent for the dye and resin and is usually a mutual solvent for the carrier of the latent ink, as well. As the dye is wetted by the mutual solvent, the dye dissolves and flows up into the coating. By carefully controlling the rate of evaporation of the mutual solvent, usually by heat, the dispersion of the dye into the coating is also controlled. The extent of dispersion of dye in the resinous coating is controlled by regulating the evaporation of solvent from the coating so that, when the solvent is substantially completely evaporated, the dye will have been transmitted into the coating to the extent desired. The thickness of the coating and the extent of flow are chosen, of course, so that, when flow is arrested, the depth of dissolved dye will give the desired concentration of dye in the resin.

The general use of my method and the resultant products in the creation by hand of sketches, drawings, and the like differs primarily from the foregoing description of the use of the method in printing in that the ink is applied by pen or brush, rather than by printing plates or like mechanical means. In hand application by pen or brush, the carrier for the dye is also usually less viscous than the carrier of a printing ink. When carriers of extremely low viscosity are used in hand application, it is sometimes necessary to agitate the ink just before use in order to suspend the dye substantially equally throughout the ink; such agitation is seldom necessary in printing inks because of the greater viscosity of the carriers employed.

The brightness and purity of color and/or fluorescence obtained by the foregoing methods are excellent. The comparative muddiness of most pigmented inks becomes readily apparent. The high intensity obtained is most noticeable in daylight fluorescent delineations, where the apparently inconsistent results of optimum fluorescence and optimum color intensity are both obtained. The high fluorescence brightness is probably due to the state of suspension and low concentration of the dye dissolved in the resin and the high color intensity is probably due to the physical depth of the body of the dissolved dye. The depth of the body of the dissolved dye also gives a depth of delineation which, in some instances, creates an illusion approaching a third dimensional effect.

Through the use of my herein disclosed inks, the sharpness and accuracy of delineations made according to the foregoing methods are excellent. When a reproduction utilizing my inks according to the foregoing methods is contrasted with a reproduction made by orthodox methods, a slight softening and loss of harshness may be noticed. Such softening and loss of harshness is apparently not so much attributable to a slight bleed of the dye parallel to the coating, as was at first suspected, but is apparently due primarily to halation resulting from diffusion of light within the film; halation is particularly noticeable in fluorescent and daylight fluorescent delineations because the fluorescing molecules act as point sources of light. Why the dye tends to flow into the resin perpendicularly to the coating and retain detail, rather than to bleed parallel to the coating and thereby cause loss of detail, is not fully understood.

By way of illustration, but not by way of limitation, the following specific examples of inks contemplated by my invention are given:

PRINTING INKS

*Example 1*

| | Parts by weight |
|---|---|
| #1 Linseed varnish | 4 |
| #3 Linseed varnish | 4 |
| Diatomaceous earth | 1 |
| Tetramethyl diamino diphenyl ketonimine hydrochloride | 6 |

The dye and diatomaceous earth are ground into the mixed linseed varnish to form a pigmented printing ink which will contain some dye in solution. The diatomaceous earth serves as a diffusion retardant for the dye and as a drier for the varnish in the printed ink. The developed ink fluoresces a bright yellow-green (primary for additive colors) under near ultraviolet and is yellow under white light.

*Example 2*

| | Parts by weight |
|---|---|
| Linseed oil-modified alkyd resin | 8 |
| Alumina hydrate | 4 |
| Ethyl ester of meta monoethyl-aminophenol-phthalein hydrochloride (a xanthene dye) | 2 |

The dye and alumina hydrate are ground into the oil-modified resin, as in Example 1. The developed ink fluoresces a bright salmon-yellow under near ultraviolet and is a pinkish-salmon under white light.

*Example 3*

| | Parts by weight |
|---|---|
| Long oil alkyd resin | 8 |
| Casein | 1 |
| Alumina hydrate | 3 |
| Meta diethylaminophenol-phthalein, base (a xanthene dye) | 2 |

The dye, hydrate, and casein are ground into the oil-modified resin, as in Example 1, the casein serving as a diffusion retardant for the dye. The developed ink fluoresces a bright orange-red and is cold red under white light.

*Example 4*

| | Parts by weight |
|---|---|
| Heavily-bodied soy bean oil | 8 |
| Sodium salt of 4 methyl 7 hydroxy coumarine | 6 |
| Magnesia | 3 |

The dye and magnesia are ground into the oil, as in Example 1. The developed ink fluoresces a pure blue and is nearly colorless under white light.

DRAFTING INKS

*Example 5*

| | Parts by weight |
|---|---|
| White waterproof drafting ink | 16 |
| Tetramethyl diamino diphenyl ketonimine hydrochloride | 1 |

The dye is ground into the drafting ink. The developed ink fluoresces a bright yellow-green and is yellow under white light.

*Example 6*

| | Parts by weight |
|---|---|
| White waterproof drafting ink | 16 |
| Meta diethylaminophenol-phthalein hydrochloride (a xanthene dye) | ¼ |

The dye is ground into the ink as in Example 5. The developed ink fluoresces a bright red and is cold red under white light.

*Example 7*

| | Parts by weight |
|---|---|
| White waterproof drafting ink | 15 |
| Royal blue waterproof drafting ink | 1 |
| Sodium salt of 4 methyl 7 hydroxy coumarine | 1 |

The dye is ground into the inks as in Example 5. The developed ink fluoresces a bright blue and is royal blue under white light.

By way of further illustration, but not by way of limitation, the following specific examples of developers which may be utilized with my herein disclosed inks are given:

DEVELOPING COMPOSITIONS

*Example 8*

Butyl alcohol-modified carbamideformaldehyde resin
 (butyl alcohol-modified urea formaldehyde resin)

| | |
|---|---|
| per cent by weight solid resin | 50 |
| Butanol per cent by weight | 50 |

The butyl alcohol-modified urea-formaldehyde resin, dissolved in butanol according to the above formula, is sprayed, roll-coated, brushed, or otherwise applied to the surface upon which inks made according to Examples 1 to 7 have been applied.

*Example 9*

| | |
|---|---|
| Cyanuramide-formaldehyde resin (melamine-formaldehyde resin) percent by weight solid resin | 40 |
| Butanol per cent by weight | 30 |
| Toluol do | 30 |

The melamine-formaldehyde resin, dissolved in a butanol-toluol mixture according to the above formula, is sprayed, roll-coated, brushed or otherwise applied to the surface upon which inks made according to Examples 1 to 7 have been applied.

*Example 10*

Glycol-phthalate resin

| | |
|---|---|
| percent by weight solid resin | 12.5 |
| Nitrocellulose per cent by weight | 12.5 |
| Ethyl acetate do | 56.25 |
| Toluol do | 18.75 |

The glycol-phthalate resin and nitrocellulose are mixed in the ethyl acetate and toluol. A developing composition according to the above formula may be sprayed, roll-coated, brushed, or otherwise applied to a surface upon which inks made according to Examples 1 to 3, 5 and 6 have been applied. A developing composition made according to this example tends to react with dyes of the type employed in Examples 3 and 7 and, therefore, is not recommended for use with such inks.

From the foregoing examples, it is apparent that I have disclosed a palette of printing inks (particularly suited for planographic printing) for mechanical application to receiving surfaces and a palette of drafting inks for manual application to receiving surfaces. Modification of the inks for other types of mechanical application, i. e., typographic, intaglio, and screen process printing, requires a modification of the carriers as to viscosity, tack, and the like, similar to variations of these characteristics in conventional pigmented inks. Similarly, hand-applied mediums, such as brush-applied oil colors and water colors, crayons, and the like, will differ primarily from the disclosed drafting inks by the substitution of suitable nonreactive carriers.

Figure 2:
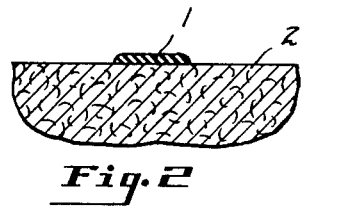
Fig. 2 is an enlarged fragmentary section taken along line 2—2 of Fig. 1.

Figs. 1 to 4a illustrate the development of my inks applied to a suitable supporting surface in line or block delineations. In Figs. 1 and 2, the latent ink 1 is applied as the letter "I" on an area of paper 2. Obviously, if the ink 1 is printed, as by lithography, an ink, as disclosed in Examples 1 to 4, will be employed; if drawn by pen, a drafting ink, as disclosed in Examples 5 to 7, will be employed.

Figure 3:
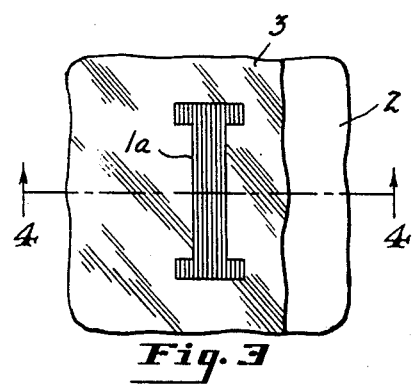
Fig. 3 is a view similar to Fig. 1 showing a portion of a sheet after the ink has been developed.
Figure 4:
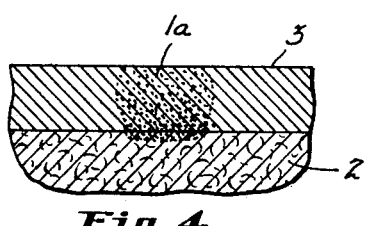
Fig. 4 is a view similar to Fig. 2, but taken along the line 4—4 of Fig. 3.
Figure 4A:
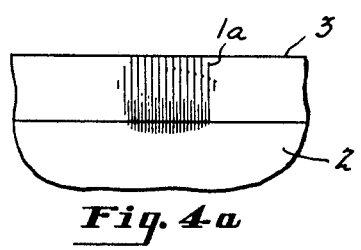
Fig. 4a is a view similar to Fig. 4 shaded to show color.

Preferably after the latent ink has dried, a transparent developing composition, as disclosed in Examples 8 to 10, is applied by roll-coating, for example, to the surface of the paper 2. As the developing composition is applied, the dye in the ink 1 diffuses or dissolves into the developing composition to form the developed delineation 1a, as shown in Figs. 3 and 4. Diffusion of the dye, i. e., the concentration of the dye in the developing composition and the depth of diffused dye, is arrested by "setting" the developing composition to form the film 3. In the developed delineation within the film 3, the dye will be in a sufficiently low concentration to permit strong fluorescence and yet, because of the mechanical depth of the delineation 1a, the effect of high color intensity is also obtained. The purity of color and absence of muddiness in the developed delineation 1a is also very noticeable.

Figure 5:
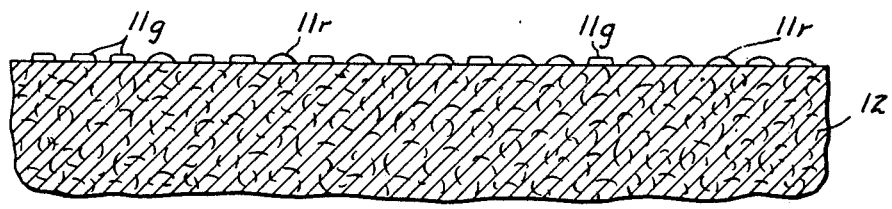
Fig. 5 is an enlarged, partly diagrammatic, fragmentary section taken at a stage similar to that shown in Fig. 2, but illustrating the utilization of my inks in multi-color printing.
Figure 6:
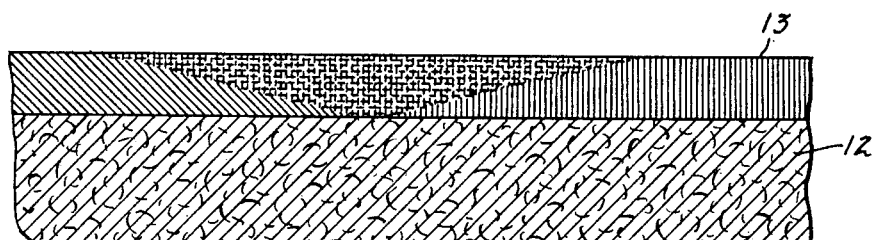
Fig. 6 is an enlarged, partly diagrammatic section of the sheet shown in Fig. 5 showing the sheet at the completion of my method.

Figs. 5 and 6 illustrate diagrammatically the employment of my inks in printing tonal and multi-color reproductions. Fig. 5 shows diagrammatically the manner of printing fluorescent inks which shade from the additive primary, green, through yellow to the additive primary, red. Dot structures of latent green ink (indicated as rectangular dots 11$^g$) and of latent red ink (indicated as semi-circular dots 11$^r$) are printed on the paper supporting surface 12 so that the relative concentration of dot structures of the two inks, per unit of area, will vary from 100% latent green to 100% latent red. A developing composition is then applied and set to form a film 13, as in setting the film 3, so that the dyes in the latent inks will disperse into the film 13. The resultant fluorescent printing will shade very gradually from the primary green through the secondary yellow to primary red, the gradualness of shading being indicated by the "color wedges" shown in Fig. 2. (No attempt is made to indicate the actual diffusion of the dyes, as in Fig. 4.) The exceptionally gradual shading is due more to the dispersion of light within the film 13 than to the mixture of the dyes in the film. Just as both strong fluorescence and high color intensity are obtained in the developed block structure illustrated in Figs. 3 and 4, so are these results obtained in the tonal structures illustrated in Figs. 5 and 6.

My inks are particularly useful in preparing original maps, drawings, and like renderings for reproductions according to the method of "Color Separation" as disclosed in the co-pending application of Joseph L. Switzer and Robert C. Switzer, Serial No. 434,080, filed March 10, 1942, which method utilizes the phenomenon that many fluorescent colors are substantially monochromatic. Heretofore, the difficulty presented by many fluorescent drafting inks were that they were either weakly colored under visible light or weakly fluorescent under ultraviolet. My drafting inks, however, are very satisfactory because the dye crystals in the latent inks are often strongly colored, or, if not, may be fortified with strong insoluble subtractive pigments. To prepare an original drawing to be reproduced by the above color separation method, therefore, an original drawing is prepared with latent inks as disclosed in Examples 5 to 7. After the latent inks have dried, the inks are developed with a suitable developing composition to produce an original having strong fluorescence and high color concentration. By selecting a palette in which the developed fluorescent colors are substantially monochromatic, the colors are accurately separated and highlight touch-up is avoided by photographing an original rendering under ultraviolet and through successive primary color filters, such as the usual Wratten filters. The successive photographs are positives showing only (except for slight ghost images which drop out in conventional methods of producing printing plates) an image of a primary color in the original. The substantially monochromatic colors are, therefore, said to be "filterably distinct."

In addition to serving as a developing composition for the latent inks, the resulting films often improve the printed articles. For example, in large reproductions exposed to atmosphere, the film protects the paper from inequal exposure to atmospheric moisture and thus prevents wrinkling between inked and uninked areas, a common fault of many such reproductions produced by conventional methods. Also, where the originals produced with my latent inks are subject to handling, the film produced by the developing composition serves as an excellent fixative.

A property of the resinous ingredients of the developing compositions disclosed is that these ingredients are solvents for the dyes of the latent inks. It is preferred that the resinous ingredients of the developing compositions act as true or apparent solvents for the dyes of the latent inks, first, in order to maintain the dye in a state of solution in the set film and thereby obtain the characteristic purity of color and fluorescence of dissolved dyes and, second, in order to stabilize many dyes, as, for example, when daylight fluorescent dyes are carried in resinous ingredients as disclosed in the co-pending application of Joseph L. Switzer and Robert C. Switzer for "Organic Fluorescent Compositions," Serial No. 452,522, filed July 27, 1942, now abandoned in favor of their co-pending continuation-in-part application of the same title, Serial No. 200,306, filed December 11, 1950.

In the examples disclosed, diffusion is controlled and arrested by "setting" the developing composition to form the dye-carrying film 13. Such control and arrest of diffusion is usually obtained by the application of heat to evaporate the solvent and/or to polymerize the resinous, i. e., film-forming, ingredients of the developing composition. Heat to control the "setting" of the film is usually applied by means of baking ovens, infra-red lamps, or like controllable means. Depending upon the rate of diffusion from the latent ink, however, air-drying developing compositions may be employed in some instances.

The primary functions of the developing compositions are, first, to diffuse, i. e., dissolve, the dye carried by the latent ink, second, to arrest diffusion, and third, to become the effective carrier of the dissolved dye. It should be apparent that any developing composition which will perform these functions will be satisfactory and that my developing compositions are not necessarily restricted to the disclosed type of composition which comprises a dye-dissolving resinous ingredient and a mutual solvent for the dye and resinous ingredient. For example, the developing composition may consist simply of a thermoplastic resinous material which will be comparatively fluid and/or possess appreciable dye-dissolving properties at elevated temperatures and which will be relatively immobile and possess no appreciable dye-dissolving properties at normal room or atmospheric temperature.

In the foregoing examples of printing inks, the concentration of dye in the carrier is greatly in excess of the concentration for maximum fluorescence whereas in the examples of drafting inks, the concentration of dye in the carrier may be only slightly in excess of the concentration for maximum fluorescence because the carrier for the drafting ink is largely volatile. The concentration of dye in either ink, when the ink is printed and dried, will be greatly in excess of the concentration for maximum fluorescence as is evidenced by the fact that such dried latent inks usually exhibit little or no fluorescence. The concentration for maximum fluorescence, that is, the concentration of a dye in a carrier at which the dye will exhibit maximum fluorescence efficiency varies with each dye and each carrier and must, therefore, be determined experimentally, bearing in mind the general rule pointed out in the above-identified application for Light-Responsive Fluorescent Media that the concentration for maximum fluorescence decreases as the wave-length of the fluorescent light increases and that the concentration becomes increasingly critical as the wave increases. Thus, as a general rule, the optimum concentration of a blue or green fluorescing dye may range from five to ten percent whereas the optimum concentration for a red fluorescing dye is approximately one percent.

It is also to be noted that the latent inks may contain diffusion retardants. The necessity for such diffusion retardants will be determined by several factors, such as the rate of diffusion of the dye out of the carrier employed in the ink, the dispersion of the dye in the latent ink, the rate of diffusion of the dye into the developing composition to be employed, and the rates of diffusion of other latent inks into the carrier where a palette of latent inks are employed in multi-color work.

In the foregoing specification and in the following claims, unless otherwise specified, the term "ink" is to be understood to include any surface ornamenting medium and the term "printing" is to be understood to include manual as well as mechanical application of the latent ink. This invention, therefore, is not limited to the particular examples, embodiments, or uses disclosed, either in whole or in part, but may be modified by those skilled in the art; this invention, therefore, is limited by the appended claims and not by the foregoing specification describing particular and preferred embodiments of my invention.

What is claimed is:

1. A palette of a media for decorating articles comprising a plurality of latent fluorescent components, one of the components of said palette comprising a carrier and a fluorescent dye dispersed in said carrier in excess of the optimum concentration at which said dye exhibits fluorescence, said dye exhibiting, when in solution at a concentration not exceeding said optimum concentration, a fluorescent color which is filterably distinct from the fluorescent color of another of the components of said palette.

2. A palette as defined in claim 1 in which the amounts of dye in the several components are proportioned to produce substantially equal fluorescent effectiveness when said dyes are diffused into a common developing composition.

3. A palette of a media for decorating articles comprising a plurality of latent fluorescent components including three primary components, each primary component comprising a carrier and a dye which exhibits a subtractive color and a fluorescent color when in solution, the concentration of said dye in said carrier being in excess of the optimum concentration at which said dye exhibits fluorescence, said dyes in each of said primaries, when in solution, fluorescing filterably distinct colors.

4. A medium for latent decoration comprising a carrier containing a non-volatile portion and a soluble dye dispersed in said carrier, the concentration of said dye with respect to the non-volatile portion of said carrier when the medium has been applied to a base being in excess of the optimum concentration of said dye for light modification and the dye being soluble when said medium has been so applied, whereby, when there is applied over the medium a developing composition containing a film-forming portion in which said dye will dissolve, said dye will diffuse into said film-forming portion and may provide an optimum concentration of dye for light modification.

5. A medium as defined in claim 4 including a diffusion retardant for said soluble dye.

6. A medium for latent decoration comprising a carrier and a soluble dye dispersed in said carrier, the concentration of said dye in said carrier when the medium has been applied to a base being in excess of the optimum concentration of said dye for light modification and the dye being soluble when said medium has been so applied, whereby, when there is applied over the medium a developing composition containing a film-forming portion in which said dye will dissolve, said dye will diffuse into said film-forming portion and may provide an optimum concentration of dye for light modification.

7. A medium for latent decoration comprising a carrier containing a non-volatile portion and a soluble dye exhibiting fluorescence when in solution, said dye being dispersed in said carrier when the medium has been applied to a base in a concentration with respect to said non-volatile portion in excess of the optimum concentration of said dye for fluorescence and the dye being soluble when said medium has been so applied, whereby, when there is applied over the medium a developing composition containing a film-forming portion in which said dye will dissolve, said dye will diffuse into said film-forming portion and may provide an optimum concentration of dye for fluorescence.

8. A medium for latent decoration comprising a drying carrier and a soluble dye exhibiting fluorescence when in solution, said dye being dispersed in said carrier in a concentration, with respect to said carrier when dried, in excess of the optimum concentration of said dye for fluorescence.

References Cited in the file of this patent
UNITED STATES PATENTS

| | | |
|---|---|---|
| 1,244,058 | Langer | Oct. 23, 1917 |
| 2,108,503 | Murray | Feb. 15, 1938 |
| 2,347,285 | Russell | Apr. 25, 1944 |